J. A. KRIESCHER.
TRACTION WHEEL.
APPLICATION FILED NOV. 11, 1915.

1,179,939.

Patented Apr. 18, 1916.
2 SHEETS—SHEET 1.

J. A. KRIESCHER INVENTOR.

BY E. F. Bond his ATTORNEY.

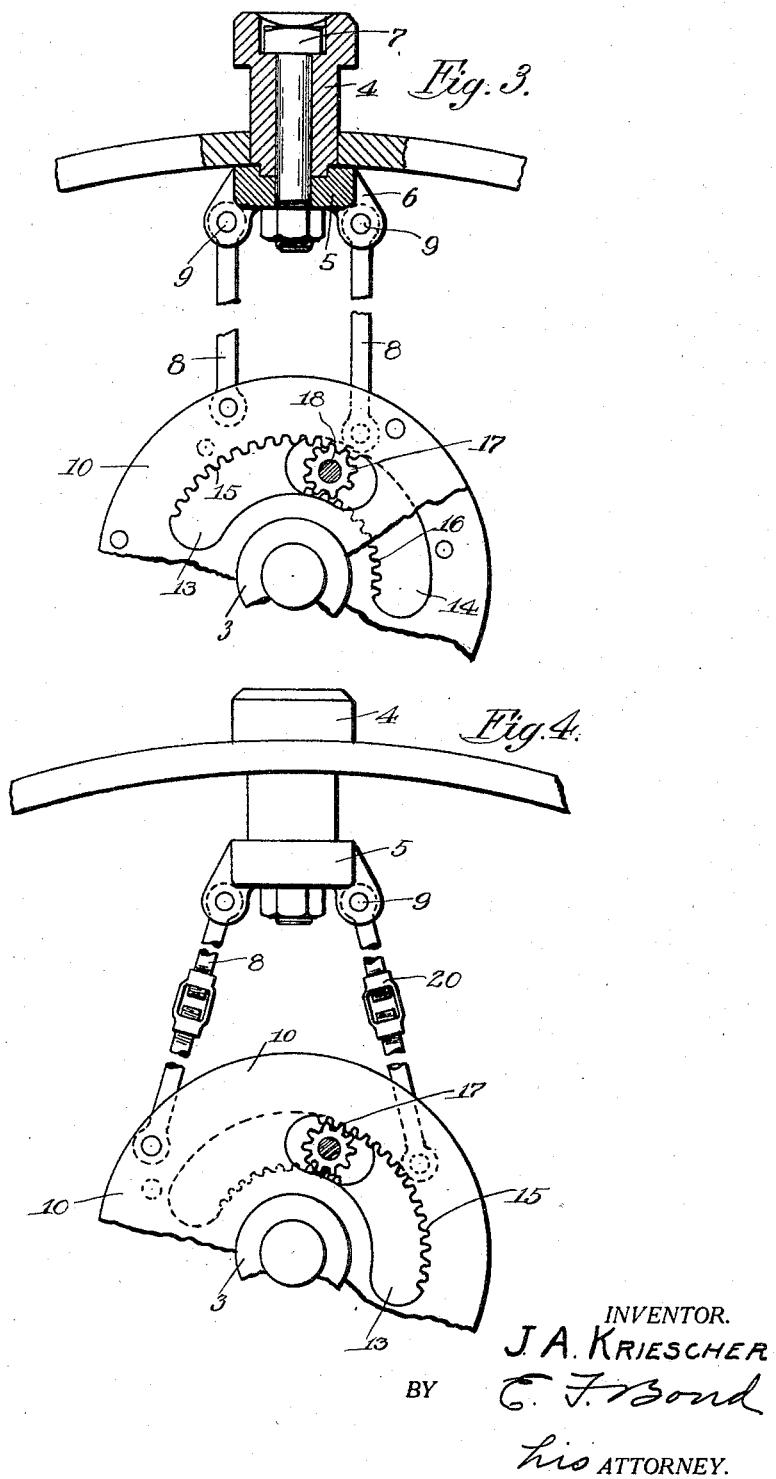

UNITED STATES PATENT OFFICE.

JOHN A. KRIESCHER, OF GREEN BAY, WISCONSIN.

TRACTION-WHEEL.

1,179,939.  Specification of Letters Patent.  Patented Apr. 18, 1916.

Application filed November 11, 1915. Serial No. 60,881.

*To all whom it may concern:*

Be it known that I, JOHN A. KRIESCHER, a citizen of the United States of America, residing at Green Bay, (R. F. D. No. 2,) in the county of Brown and State of Wisconsin, have invented certain new and useful Improvements in Traction-Wheels, of which the following is a specification, reference being had therein to the accompanying drawing.

The invention relates to traction wheels.

The principal object of the invention consists in providing a wheel which is adapted for travel on sandy, soft roads without appreciable loss of traction.

Another object of the invention is the provision on wheels of lugs which are slidably secured in the wheel rim and may be shifted according to the character of the road.

A further object of the invention is embodied in the provision of efficient means for changing the position of the lugs with respect to the wheel rim.

It is also an object of the invention to provide certain details and features of construction and combinations tending to increase the effectiveness and general desirability of a device of this particular character.

With these and other objects in view the invention consists in the novel combination of arrangement of parts to be hereinafter described and specifically pointed out in the appended claims.

Figure 1:
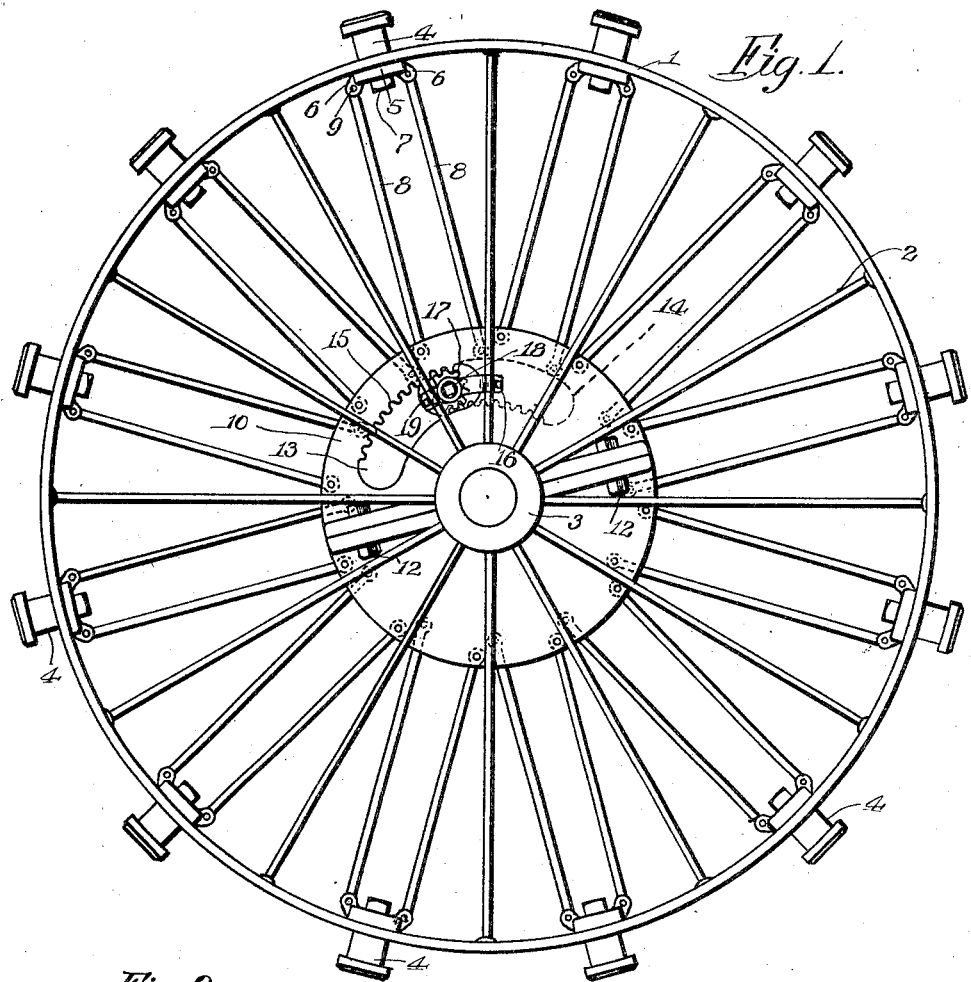
Figure 2:
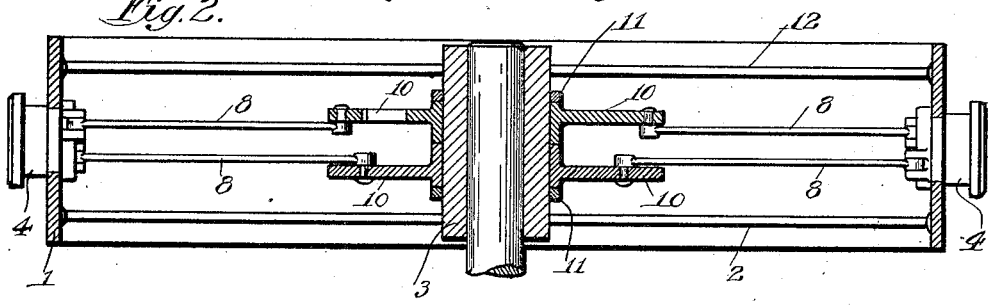

In the accompanying drawings Figure 1 is a side elevation of a wheel to which the invention has been applied. Fig. 2 is a transverse sectional view of the wheel. Fig. 3 is an enlarged sectional view of the lug and an elevational view of its appertaining parts, the lug being shown in its outermost or extended position. Fig. 4 is a view similar to Fig. 3, wherein the lug assumes its innermost or retracted position.

The wheel comprises the rim 1, the hub 3 and a series of spokes 2 which interconnect the hub with the rim. A plurality of oblong blocks or lugs 4 are slidably mounted in the rim 1 and are formed integral at their outer ends with an enlarged portion adapted to contact with the outer surface of the rim when in the inner or retracted position. The inner end of the lugs abuts on a casing 5 which contacts with the inner surface of the wheel rim when the lugs are in their outermost or extended position. A bolt 7 serves to contact the lug and the casing, and its head is received within the enlarged portion of the lug which is apertured and recessed for this purpose. The casings are formed integral with ears 6 projecting therefrom and being apertured to receive a pin 9, whereby one end of connecting rods 8 is pivotally secured to said casing. The opposite end of the connecting rods is pivotally connected to one or the other of a pair of flanges 10 rotatably mounted on the hub of the wheel between the spokes 2 and held in place by means of set collars 11. The flanges are made in two parts as indicated in Fig. 1 and are held together by bolts 12, whereby the mounting and demounting of the flanges may be conveniently effected. Each of the flanges is provided with a concentric slot or opening 13 and 14, respectively, having the same radii of curvature. The openings are so arranged that they extend in opposite directions, but adjacent parts of said slots overlap to form a straight passage parallel to the axis of the wheel.

The slot 13 is provided with teeth 15 on its upper edge, while the opening 14 has teeth 16 on its lower edge. The pinion 17 is arranged within the aforementioned axial passage and is keyed to a shaft 18 rotatably held in bearings 19 secured to the spokes 2 of the wheel. One end of the shaft is secured and projects beyond the bearing 19 so that a suitable wrench may be applied when a turning of the pinion is desired. The connecting rods 8 are preferably provided with turn buckles 20, as indicated in Fig. 4. However, if desired, they may be dispensed with.

The operation of the lugs is as follows: Upon turning of the pinion 17 in either direction the flanges 10 will be rotated in opposite directions with respect to each other on the hub 3. Assuming with respect to Fig. 3 that the pinion 17 is turned clockwise, the front flange 10 will then also rotate clockwise while the rear flange 10 will be rotated counter-clockwise, since the teeth 16 are provided on the lower edge of the slot 14. Due to this rotation of the flanges the connecting rods 8 withdraw the lugs 4 from the outermost or extended position until the enlarged portion thereof contacts with the outer surface of the wheel rim, whereupon the turning of the pinion ceases.

From the drawing it is evident that the pitch diameter is larger for the teeth 15 than for the teeth 16 and for this reason the rear flange will revolve with a greater angular velocity than the front flange. To compensate for this difference of velocities the connecting rods are pivotally secured to the flanges at different distances from the center.

I claim:

1. A traction wheel comprising a plurality of radial lugs extending through the wheel rim and adapted to be reciprocated in radial direction, a pair of flanges rotatably mounted on the hub of the wheel, rods interconnecting said flanges and said lugs, said flanges being provided with concentric slots extending in opposite directions but having adjacent portions of said slots in overlapping relation to form a passage parallel to the axis of the wheel, said slots being provided with teeth, a pinion arranged in said passage and meshing with said teeth of the flanges and means for turning said pinion.

2. A traction wheel comprising a plurality of radial lugs extending through the wheel rim and adapted to be reciprocated in radial direction, a pair of spaced flanges rotatably mounted on the hub of the wheel, rods interconnecting said flanges and said lugs, said flanges being provided with concentric slots extending in opposite directions but having adjacent portions of the slots in overlapping relation to form an axial passage, said slots being provided with teeth on the upper and lower edge respectively, a pinion arranged in said passage and meshing with the upper and lower teeth of said flanges and means for turning said pinion.

3. A traction wheel comprising a plurality of radial lugs extending through the wheel rim and adapted to be reciprocated in radial direction, a pair of spaced flanges rotatably mounted on the hub of the wheel, rods interconnecting said flanges and said lugs, said flanges being provided with concentric slots extending in opposite directions but having adjacent portions of the slots in overlapping relation to form an axial passage, said slots being provided with teeth on the upper and lower edge respectively, a pinion arranged in said passage and meshing with the upper and lower teeth of said flanges and means for turning said pinion, said rods being connected at different distances from the center of the flanges, substantially as described.

In testimony whereof I hereunto affix my signature.

JOHN A. KRIESCHER.

Copies of this patent may be obtained for five cents each, by addressing the "Commissioner of Patents, Washington, D. C."